Nov. 3, 1931.  A. MOORHOUSE  1,830,124
INTERNAL COMBUSTION ENGINE
Filed April 28, 1928

Inventor
ALFRED MOORHOUSE.
By
Attorney

Patented Nov. 3, 1931

1,830,124

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed April 28, 1928. Serial No. 273,526.

This invention relates to internal combustion engines and more particularly to thermostatically controlled shutters for the radiator thereof.

It has been proposed to employ an automobile radiator with a shutter for controlling the passage of air therethrough and with a thermostat operatively connected to the shutter, the thermostat being positioned in the radiator. Such a type has had the inherent objection that it is difficult to obtain access to the thermostatic element or elements for purposes of adjustment, repairs or replacement.

It frequently happens that the thermostatic means is too responsive or is insufficiently responsive for proper thermostatic control of the engine controlling system, and to correct this condition the thermostatic means is usually substituted or adjusted. Heretofore, this substitution or adjustment has necessitated the disassembly of a considerable part of the mechanism in order to gain access to the thermostatic means. This is avoided in the present device by the provision of an improved means for mounting the thermostat whereby it may be easily and quickly withdrawn without disassembling the shutter mechanism.

An object of the invention is to provide an improved means for housing or mounting the thermostatic element or elements in a manner that access thereto can be easily obtained for substituting these elements or for the adjustment thereof.

Another object of the invention is to provide a thermostatically controlled radiator shutter for motor vehicles having the thermostatic element or elements so positioned in the upper radiator tank that the element or elements may be easily accessible from the back of the radiator by the disassembly of the connection for the pipe leading from the upper tank of the radiator to the water jacket of the engine.

A further object of the invention is to provide a thermostatically controlled radiator shutter having the thermostat positioned in the upper tank of the radiator for ready removal and operatively connected to the shutter in such a manner that but few parts are required which shall be positive in action, highly efficient in operation and of marked simplicity so that its manufacture is economically facilitated both as regards to parts and their assembly.

Other objects of the invention will appear from the following description taken in connection with the drawings, which form a part of this specification, and in which.

Figure 1:
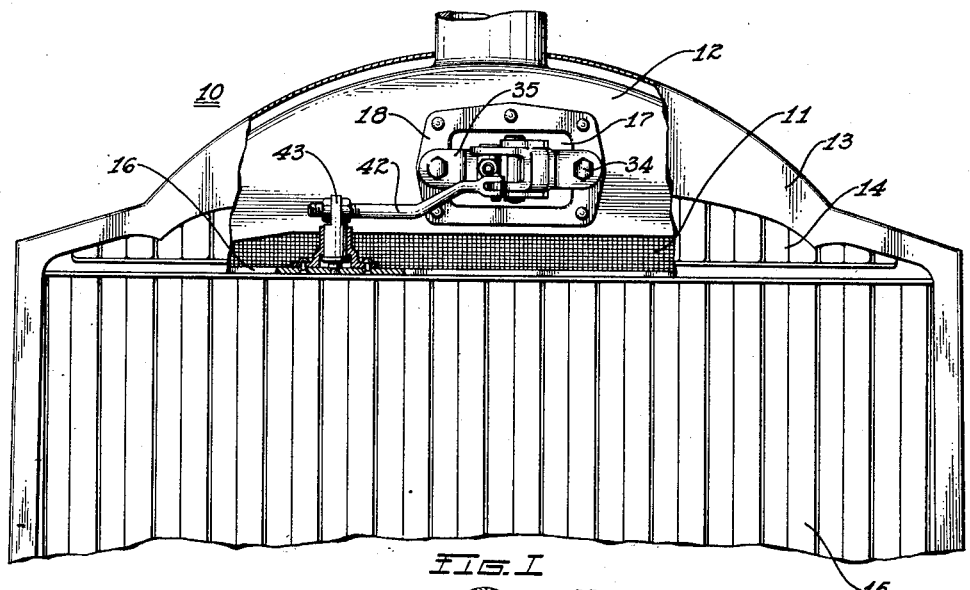
Figure 1 is a front elevation of a radiator equipped with a thermostatically controlled shutter, parts of the radiator and shell being broken away.
Figure 2:
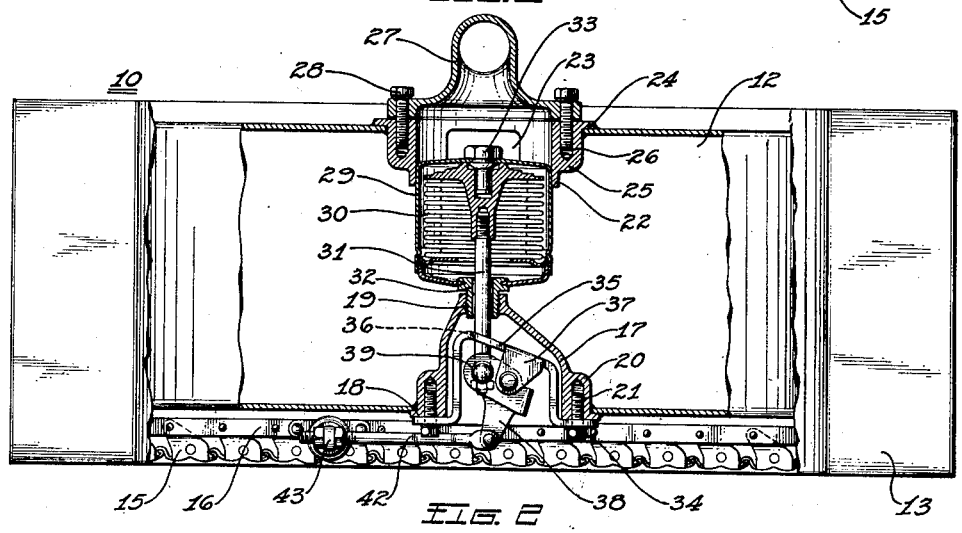
Figure 2 is a top plan view of the radiator, partly broken away, illustrating the mounting, a thermostat positioned therein and connected to the shutter.
Figure 3:
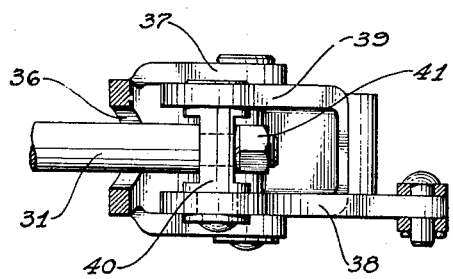
Figure 3 is an enlarged detail view of the linkage between the thermostat and the shutter.

Referring to the drawings for more specific details of the invention, 10 represents an internal combustion engine radiator of any suitable structure having a core 11 and an upper radiator tank 12 positioned in a shell 13. As shown, the shell is provided with an ornamental front 14 but this is by no means essential. Positioned on the front of the radiator is a shutter 15 which is of the preferred type wherein the louvers of the shutter are operatively connected to a slide 16.

Permanently secured in the front face of the tank 12, substantially centrally, is a cup or housing 17. As shown, the cup 17 has a flange 18 soldered and bolted to the front plate or wall of the tank to support the cup within the tank and the bowl of the cup is provided with an aperture 19. The cup is further provided with oppositely disposed bosses 20 recessed as indicated at 21. Soldered or otherwise permanently secured in the back wall of the tank 12 in axial alinement with the aperture 19 in the bowl of the cup is an inlet sleeve 22 having a radial opening 23, a radial flange 24 by which the sleeve is secured in position and oppositely disposed bosses 25 recessed as indicated at 26. A connection 27 bears upon the flange 24 and is secured in position by bolts 28 threaded into the recesses 26. This connection communicates with the radiator tank through the opening 23 in the sleeve 22 and connects the radiator with the water jacket of an engine, not shown.

Positioned in the inlet sleeve 22 is a thermostat comprising a suitable casing 29 having a diameter substantially equal to the inner diameter of the sleeve 22 to insure a snug fit. This casing encloses a thermostatic element 30 connected by a stem 31 mounted for reciprocation in a sleeve or collar 32 secured in one end of the casing, the other end of the casing being provided with a centrally disposed bolt 33 extending inwardly to provide a suitable guide for the thermostatic element. The sleeve 32 on the casing 29 is threaded in the aperture 19 in the bowl of the cup 17 to secure the casing 29 in position and when so assembled the stem 31 extends into the cup or housing 17.

Secured upon the flange 18 on the cup 17 as by bolts 34 threaded into the recesses 21 in the bosses 20 is a substantially U-shaped bracket 35 apertured as indicated at 36 to receive the stem 31 carried by the thermostatic element. This bracket is provided with oppositely disposed lugs 37 between which is pivotally secured a bell crank lever. As shown, the bell crank lever has a single arm 38 and a bifurcated arm 39. The bifurcated arm has pivotally mounted therein a rotatable member 40 apertured to receive the stem 31 which is secured therein by a nut 41 and the arm 38 is connected by a rod 42 to a stud 43 pivotally secured to the slide 16.

In assembly, the connection 27 is removed and the thermostatic unit inserted in the inlet sleeve 22 in which position the sleeve 32 carried by the thermostat casing registers with and is threaded in the aperture 19 in the cup 17. When this unit is in adjusted position the stem 31 carried by the thermostatic element is connected to the rotatable member 40 between the branches of the bifurcated arm on the bell crank lever, the other arm of which is connected by a suitable linkage to the shutter. The thermostatic element is responsive to the temperature variations in the cooling medium and as the thermostatic element is operatively connected to the shutter, it is apparent that the actuation of the shutter is in accordance with the temperature variations. It will be observed that by removing the connection 27 and disconnecting the thermostatic unit, removal of the unit may be easily and quickly effected through the inlet sleeve 22 for the purpose of such adjustment, replacement or repairs that may be found necessary or desirable.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of my invention, what I claim as new and desire to secure by Letters Patent is:

1. The combination with a radiator, of a shutter for the radiator, a housing in the radiator opening through the wall thereof, a thermostat supported on the housing and a linkage pivotally supported in the housing connecting the thermostat to the shutter.

2. The combination with a radiator, of a shutter for the radiator, a cup having a bowl positioned in the radiator, a thermostat positioned on the bowl and a bell crank lever in the bowl connecting the thermostat to the shutter.

3. The combination with a radiator, of a support therein, a sleeve in the wall of the radiator opposite the support and a thermostat rigidly mounted on the support and partially engaged and supported by the sleeve.

4. The combination with a radiator, of a shutter for the radiator, a cup secured in the front wall of the radiator and extending thereinto, a sleeve positioned in the rear wall of the radiator opposite the cup, the sleeve having radial openings therein, a thermostat rigidly supported by the cup, said thermostat extending within the sleeve on one side of the radial openings and removable through the sleeve, a water connection for the sleeve on the other side of the radial openings, and means for operatively connecting the thermostat to the shutter.

5. The combination with a radiator, of a shutter for the radiator, a cup member in the front wall of the radiator having a bowl positioned within the radiator, a sleeve positioned in the rear wall of the radiator opposite the cup member, the sleeve having radial openings, a thermostat mounted on the cup member and removably supported within the sleeve to one side of the openings, a connection for the sleeve on the other side of the openings and a bell crank lever positioned in the cup member and operatively connecting the thermostat to the shutter.

6. The combination with a radiator, of a shutter for the radiator, a cup member in the front wall of the radiator having a bowl positioned within the radiator, a sleeve positioned in the rear wall of the radiator opposite the cup member, the sleeve having radial openings, a thermostat demountably connected to the cup member and removably supported in the sleeve to one side of the radial openings, means in the bowl of the cup for operatively connecting the thermostat with the shutter and a demountable water inlet connection for the sleeve providing ready access to the thermostat.

7. In an internal combustion engine, the combination with a radiator, of a housing secured to the front wall of the radiator, a sleeve in the rear wall of the radiator opposite the housing, a thermostat positioned in and removable through the sleeve and rigidly secured detachably to the housing, and a water connection for the sleeve.

8. In a fluid heat transfer system, a radiator, an inlet sleeve extending through a wall of the radiator and forming a passage through which fluid flows from the source of heat through the radiator wall in its circulation, a thermostat mounted in the end of the inlet sleeve extending within the radiator and removable therefrom through the sleeve, said thermostat having its axis coincident with that of the sleeve, and a control element connected to be actuated by the thermostat.

9. The combination with a radiator, of an inlet sleeve for the circulatory system extending through a wall of the radiator and adapted to conduct cooling fluid through the radiator wall, a flange on the sleeve permanently secured to the wall of the radiator, a thermostat supported in the sleeve within the radiator and removable therefrom through the sleeve, and means for removably securing a fluid inlet connection to the sleeve on the outside of the radiator.

10. The combination with a radiator having an opening, of an inlet sleeve for the circulatory system positioned in the opening adapted to conduct cooling fluid through the radiator wall, a flange on the sleeve secured in a fixed position to the wall of the radiator, the sleeve having radial openings interiorly of the radiator, a thermostat in the radiator supported in the sleeve to one side of the radial openings and removable through the sleeve, and means for securing a fluid inlet connection to the sleeve on the exterior of the radiator.

11. In a circulating system for transferring heat including a radiator, means for regulating the rate of transfer of heat including an inlet sleeve projecting through a wall of the radiator through which fluid flows from the source of heat through the radiator wall in its circulation, and a thermostat positioned in the inlet sleeve within the radiator and removable therefrom through the sleeve.

12. In a system for transferring heat including a radiator, means for regulating the rate of transfer of heat including an open ended sleeve extending through a wall of the radiator to constitute a passageway through the wall thereof for the fluid, a thermostat positioned in the sleeve within the radiator and removable therefrom through the sleeve, and a union removably secured to the sleeve and extending exteriorly of the radiator, said union providing a passageway for the cooling fluid and covering the open end of the sleeve.

13. The combination with a radiator, of a shutter for the radiator, a housing positioned in one wall of the radiator, a thermostat supported on the housing and on the other wall of the radiator and means positioned in the housing for operatively connecting the thermostat to the shutter.

In testimony whereof I affix my signature.
ALFRED MOORHOUSE.